United States Patent
Chen et al.

(10) Patent No.: US 7,858,943 B2
(45) Date of Patent: Dec. 28, 2010

(54) METHODS OF PERFORMING PET SINOGRAM QUALITY CHECK

(75) Inventors: Mu Chen, Knoxville, TN (US); Michael E. Casey, Louisville, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 321 days.

(21) Appl. No.: 12/204,180

(22) Filed: Sep. 4, 2008

(65) Prior Publication Data

US 2009/0074152 A1   Mar. 19, 2009

Related U.S. Application Data

(60) Provisional application No. 60/973,360, filed on Sep. 18, 2007.

(51) Int. Cl.
 *G01D 18/00* (2006.01)
(52) U.S. Cl. .............................. 250/363.03; 250/252.1; 250/363.09; 378/207; 702/81; 702/182
(58) Field of Classification Search .............. 250/252.1, 250/363.03, 363.09; 378/207; 702/81, 182
See application file for complete search history.

(56) References Cited

U.S. PATENT DOCUMENTS

| 7,569,829 | B2 * | 8/2009 | Chen et al. | 250/363.09 |
| 2004/0206897 | A1 * | 10/2004 | Conti et al. | 250/252.1 |
| 2007/0147589 | A1 * | 6/2007 | Thielemans | 378/207 |
| 2007/0176087 | A1 * | 8/2007 | Wang et al. | 250/252.1 |

* cited by examiner

*Primary Examiner*—David P Porta
*Assistant Examiner*—Djura Malevic
(74) *Attorney, Agent, or Firm*—Peter L. Kendall

(57) ABSTRACT

A method for determining quality of sinograms produced by a medical imaging device. The method may include placing a uniform phantom object in the field of view of the medical imaging device; acquiring one or more phantom sinograms of the uniform phantom object; establish a set of parameters for the acquired one or more phantom sinograms; and determine, based on pre-set ranges of the parameters, the quality of sinograms produced by the medical imaging device. The parameters may be one or more parameters of a group of parameters consisting of block uniformity, block efficiency, randoms rate, scanner efficiency, and scatter ratio.

24 Claims, 21 Drawing Sheets

METHODS OF PERFORMING PET SINOGRAM QUALITY CHECK

PRIORITY CLAIM

Under 35 USC 120, this application claims priority from U.S. Patent Application Ser. No. 60/973,360, filed on Sep. 18, 2007, the contents of which are hereby incorporated by reference in their entirety.

TECHNICAL FIELD

The technical field of the present application relates to quality checks for tomography. More particularly, the system and method relate to quality checks for a medical imaging device such as a positron emission tomograph (PET) or a positron emission tomograph combined with computed tomograph for X-ray (PET/CT).

BACKGROUND

In CT, an external x-ray source is caused to be passed around the patient. Detectors around the patient then respond to x-ray transmission through the patient to produce an image of an area of study. Unlike PET, which is an emission tomography technique because it rely on detecting radiation emitted from the patient, CT is a transmission tomography technique which utilizes only a radiation source external to the patient.

PET is a branch of nuclear medicine in which a positron-emitting radiopharmaceutical such as $^{18}$F-fluorodeoxyglucose (FDG) is introduced into the body of a patient. Using compounds such as $^{11}$C-labeled glucose, $^{18}$F-labeled glucose, $^{13}$N-labeled ammonia and $^{15}$O-labeled water, PET can be used to study such physiological phenomena as blood flow, tissue viability, and in vivo brain neuron activity. Positrons emitted by these neutron deficient compounds interact with free electrons in the body area of interest, resulting in the annihilation of the positron. This annihilation yields the simultaneous emission of a pair of photons approximately 180 degrees apart. The radiation resulting from annihilation is detected by a PET tomograph. More specifically, each of a plurality of positrons reacts with an electron in what is known as a positron annihilation event, thereby generating a coincident pair of 511 keV gamma rays which travel in opposite directions along a line of response (LOR). After acquiring these annihilation "event pairs" for a period of time, the isotope distribution in a cross section of the body can be reconstructed.

A PET scanner is used to detect the positron annihilation events and generate an image of at least portions of the patient from a plurality of detected events. The PET scanner may comprise a plurality of radiation-sensitive PET detectors arrayed about an examination region through which a patient is conveyed. The PET detectors typically comprise crystals and photomultiplier tubes (PMTs). The detector crystals, also referred to as scintillators, convert the energy of a gamma ray into a flash of light that is sensed by the detector PMT. In coincidence mode a gamma ray pair detected within a coincidence time by a pair of PET detectors is recorded by the PET scanner as an annihilation event. During a patient scan hundreds of million of events are typically detected and recorded. Due to the approximate 180 degree angle of departure from the annihilation site, the location of the two detectors registering the event define the LOR passing through the location of the annihilation. Detection of the LORs is performed by a coincidence detection scheme. A valid event line is registered if both photons of an annihilation are detected within a coincidence window of time. Coincidence detection methods ensure that an event line is histogrammed only if both photons originate from the same positron annihilation. The observed events are typically sorted and organized with respect to each of a plurality of projection rays. By histogramming these lines of response, a "sinogram" is produced that may be used by, for example, a process to produce a three dimensional image of the activity. All events occurring along each projection ray may be organized into one bin of a three-dimensional sinogram array. The array may be stored in a computer-readable memory media. The sinogram data is then processed to reconstruct an image of the scanned volume.

Prior to image reconstruction, efficiency normalization techniques are used to correct the sinogram data for non-uniform PET detector responses due to, for example, PET scanner geometry, detector crystal non-uniformity, and gain variation in detector PMT's. Efficiency normalization may be regarded as being quality check procedures for PET or PET/CT and may be done in several different ways. One method may include placing a uniform phantom cylinder in the field of view of the PET and scanning this cylinder for a certain time (for example 200 million counts) to acquire a uniform phantom sinogram. Thereafter, such a method may compute crystal efficiency arrays from the uniform phantom sinogram and from another standard quality check sinogram, a normalization sinogram. The system quality may then be determined based on a statistical valuation, such as the chi-square value, between these two crystal efficiency arrays. By comparing if any errors between the computed crystal efficiency of the uniform phantom sinogram is within a selected statistical (for example a chi-square value) range of the crystal efficiency of the normalization sinogram it may be determined if the quality of the PET scanner is within an acceptable range.

For example, scanning of a known uniform phantom object on a regular basis and store its sinogram may result in a standard sinogram that is stored for a specific PET scanner. When a quality check is subsequently performed, for example every morning, the same uniform phantom object is placed in the field of view of the PET. By comparing if any errors of a computed crystal efficiency of the newly obtained sinogram is within a selected statistical (for example a chi-square value) range of the crystal efficiency of the stored standard sinogram it may be determined if the quality of the PET scanner is within an acceptable range.

A chi-square test is any statistical hypothesis test in which the test statistic has a chi-square distribution when the null hypothesis is true, or any statistical hypothesis test in which the probability distribution of the test statistic (assuming the null hypothesis is true) can be made to approximate a chi-square distribution as closely as desired by making the sample size large enough. Specifically, a chi-square test for independence evaluates statistically significant differences between proportions for two or more groups in a data set.

It takes the same requirement to acquire the uniform phantom sinogram as it takes to acquire the normalization sinogram. In certain situations the normalization sinogram is needed frequently, for example daily in a mobile environment. Daily quality checks must re-acquire the uniform phantom sinogram and compare it with the normalization sinogram acquired minutes ago. This creates extra data acquisition time and is not an efficient usage of data.

In view of the quality check procedures for PET or PET/CT, but also for other tomography procedures, it is desirable to provide a quality check procedure that is short in time. Additionally or alternatively, the quality check procedure should make efficient use of existing data and processing capacity.

It is desirable to provide a quality check procedure that will result in an improve quality of the image reconstruction procedure and the resulting image. Besides the continuous quest for improved image quality, it may be desirable to have an efficient and/or sensitive medical device performing PET, PET/CT, SPECT or SPECT/CT. This would allow for a reduction in time for taking images, an improved quality of the images, and/or a reduction of exposure of a subject to the image apparatus.

Additionally, it is desirable to avoid cumbersome and time consuming arrangements or methods for checking quality, in an economic and technical perspective.

SUMMARY

In one embodiment, a method for determining quality of sinograms produced by a medical imaging device, may comprise the steps of placing a uniform phantom object in the field of view of the medical imaging device; acquiring one or more phantom sinograms of the uniform phantom object; establish a set of parameters for the acquired one or more phantom sinograms; and determine, based on pre-set ranges of the parameters, the quality of sinograms produced by the medical imaging device; wherein the parameters comprises one or more parameters of a group of parameters consisting of block uniformity, block efficiency, randoms rate, scanner efficiency, and scatter ratio.

An embodiment for further establishing the block uniformity may further comprise the steps of obtaining mean crystal efficiency averaged over all blocks in the medical imaging device; and calculating for each of the blocks the root mean square error (RMSE) based on the mean crystal efficiency; and wherein determining the quality of sinograms produced by the medical imaging device is made in relation to the RMSE of each block being inside or outside a pre-set range. The pre-set range may be 10.

An embodiment for further establishing the block efficiency may further comprise the steps of calculating the block efficiency for each block based on the mean crystal efficiency averaged over all blocks; and wherein determining the quality of sinograms produced by the medical imaging device is made in relation to the block efficiency of each block being inside or outside a pre-set range. The pre-set range may be 20 percent.

An embodiment for further establishing the randoms rate efficiency may further comprise the steps of calculating total numbers of line of responses (LORs) during a coincidence window and multiply the total numbers of LORs with the square of the singles rate per crystal; and wherein determining the quality of sinograms produced by the medical imaging device is made in relation to the randoms rate being inside or outside a pre-set range. The pre-set range may be set to plus/minus 15 percent.

An embodiment for further establishing the scanner efficiency may further comprise the steps of calculating the total number of true events over a specific scan time divided by an amount of activity in the field of view; and wherein determining the quality of sinograms produced by the medical imaging device is made in relation to the scanner efficiency being inside or outside a pre-set range. The pre-set range may be set to plus/minus 30 percent.

An embodiment for further establishing the scatter ratio may further comprise the steps of calculating the scatter ratio as scatter events compared to total events; and wherein determining the quality of sinograms produced by the medical imaging device is made in relation to the scatter ratio being inside or outside a pre-set range. The pre-set range may be set to plus/minus 30 percent.

The embodiment of the medical imaging device may relate to a positron emission tomograph (PET), or positron emission tomograph combined with computed tomograph for X-ray (PET/CT).

In an embodiment a medical imaging device for checking quality of sinograms produced by the medical imaging device may comprise detectors for scanning a uniform phantom object in the field of view of the detectors; at least one processor configured to acquire one or more phantom sinograms of the uniform phantom object; the at least one processor being further configured to establish a set of parameters for the acquired one or more phantom sinograms; and the at least one processor being further configured to determine, based on pre-set ranges of the parameters, the quality of sinograms produced by the medical imaging device, wherein the parameters comprises one or more of a group of parameters consisting of block uniformity, block efficiency, randoms rate, scanner efficiency, and scatter ratio.

In an embodiment the at least one processor is further configured to establishing the block uniformity by obtaining mean crystal efficiency averaged over all blocks in the medical imaging device; and calculating for each of the blocks the root mean square error (RMSE) based on the mean crystal efficiency; and the at least one processor is further configured to determine the quality of sinograms produced by the medical imaging device in relation to the RMSE of each block being inside or outside a pre-set range. The pre-set range may be set to 10.

In an embodiment the at least one processor is further configured to establishing the block efficiency by calculating the block efficiency for each block based on the mean crystal efficiency averaged over all blocks; and the at least one processor is further configured to determine the quality of sinograms produced by the medical imaging device in relation to the block efficiency of each block being inside or outside a pre-set range. The pre-set range may be set to 20 percent.

In an embodiment the at least one processor is further configured to establishing the randoms rate efficiency by calculating total numbers of line of responses (LORs) during a coincidence window and multiply the total numbers of LORs with the square of the singles rate per crystal; and the at least one processor is further configured to determine the quality of sinograms produced by the medical imaging device in relation to the randoms rate being inside or outside a pre-set range. The pre-set range may be set to plus/minus 15 percent.

In an embodiment the at least one processor is further configured to establishing the scanner efficiency by calculating the total number of true events over a specific scan time divided by an amount of activity in the field of view; and wherein the at least one processor is further configured to determine the quality of sinograms produced by the medical imaging device in relation to the scanner efficiency being inside or outside a pre-set range. The pre-set range may be set to plus/minus 30 percent.

In an embodiment the at least one processor is further configured to establishing the scatter ratio by calculating the scatter ratio as scatter events compared to total events; and the at least one processor is further configured to determine the quality of sinograms produced by the medical imaging device in relation to the scatter ratio being inside or outside a pre-set range. The pre-set range may be set to plus/minus 30 percent.

Embodiments relating to the medical imaging device may be a positron emission tomograph (PET), or positron emission tomograph combined with computed tomograph for X-ray (PET/CT).

In view of the quality check procedure used, embodiments may provide a quality check procedure that is short in time. Embodiments may make efficient use of existing data and processing capacity.

Embodiments of the quality check procedure may result in an improve quality of the image reconstruction procedure and the resulting image. Embodiments may provide an efficient and/or sensitive medical device performing PET, PET/CT, SPECT or SPECT/CT. Embodiments may allow for a reduction in time for taking images, an improved quality of the images, and/or a reduction of exposure of a subject to the image apparatus.

Embodiments may avoid cumbersome and time consuming arrangements or methods for checking quality, in an economic and technical perspective.

Other technical advantages of the present disclosure will be readily apparent to one skilled in the art from the following description and claims. Various embodiments of the present application obtain only a subset of the advantages set forth. No one advantage is critical to the embodiments. Any claimed embodiment may be technically combined with any preceding claimed embodiment(s).

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain, by way of example, the principles of the invention.

DETAILED DESCRIPTION

Figure 1:
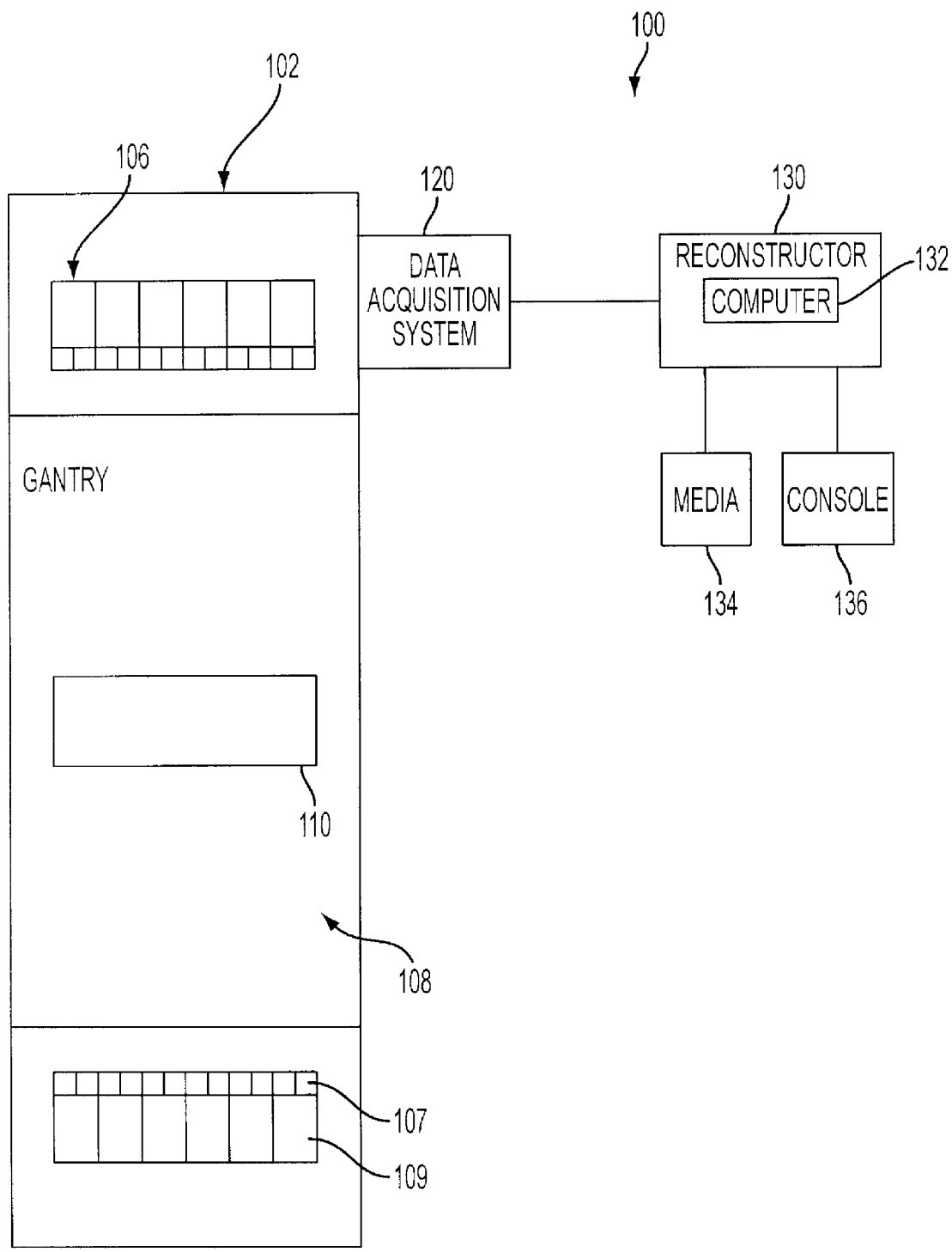
FIG. 1 an embodiment of a medical imaging device with a uniform phantom sinogram in the field of view of the medical imaging device.

With reference to the embodiment shown in FIG. 1, a medical imaging device 100, for example a PET or a PET/CT, may include a ring gantry portion 102. The gantry portion 102 includes one or more axial rings of radiation sensitive detectors 106 which surround an examination region 108, also referred to as the field of view (FOV). The detectors 106 comprise scintillator crystals 107 that convert the energy of each 511 KeV gamma ray characteristic of a positron annihilation event occurring within the PET examination region 108 into a flash of light that is sensed by a photomultiplier tube (PMT) 109. A data acquisition system 120 provides annihilation event projection data re-binned into one or more sinogram or projection bins which includes information on the LOR for each event, such as a transverse and longitudinal position of the LOR, its transverse and azimuthal angles, number of events, scan time, etc.

An object 110 to be imaged may be placed in the FOV 108 of the detectors 106, in coordination with operation of the medical imaging device 100 so that the object 110 can be scanned. The object schematically shown in FIG. 1 may be a uniform phantom object 110. Such a uniform phantom object may be used for determining the quality of the sinograms produced by the medical imaging device 100. Consequently, the quality of the medical imaging device may be determined upon the produced sinogram quality.

A reconstructor 130 includes at least one computer or computer processor 132. The reconstructor 130 performs corrections on the projection data including detector efficiency normalization corrections and uses an iterative technique to generate volumetric image data from the corrected projection data, the image data indicative of the distribution of the radionuclide in the object 110. Computer readable instructions which cause the processor 132 to carry out the projection data correction and/or volumetric image data generation are preferably carried on one or more computer readable media 134 such as computer disks, volatile or non-volatile memory, or the like, and may also be transmitted by way of a suitable communications network such as the internet to storage media 134 accessible to the processor 132. A workstation computer may function as an operator console 136 and includes a human readable output device such as a monitor or display and input devices such as a keyboard and mouse.

Figure 2:
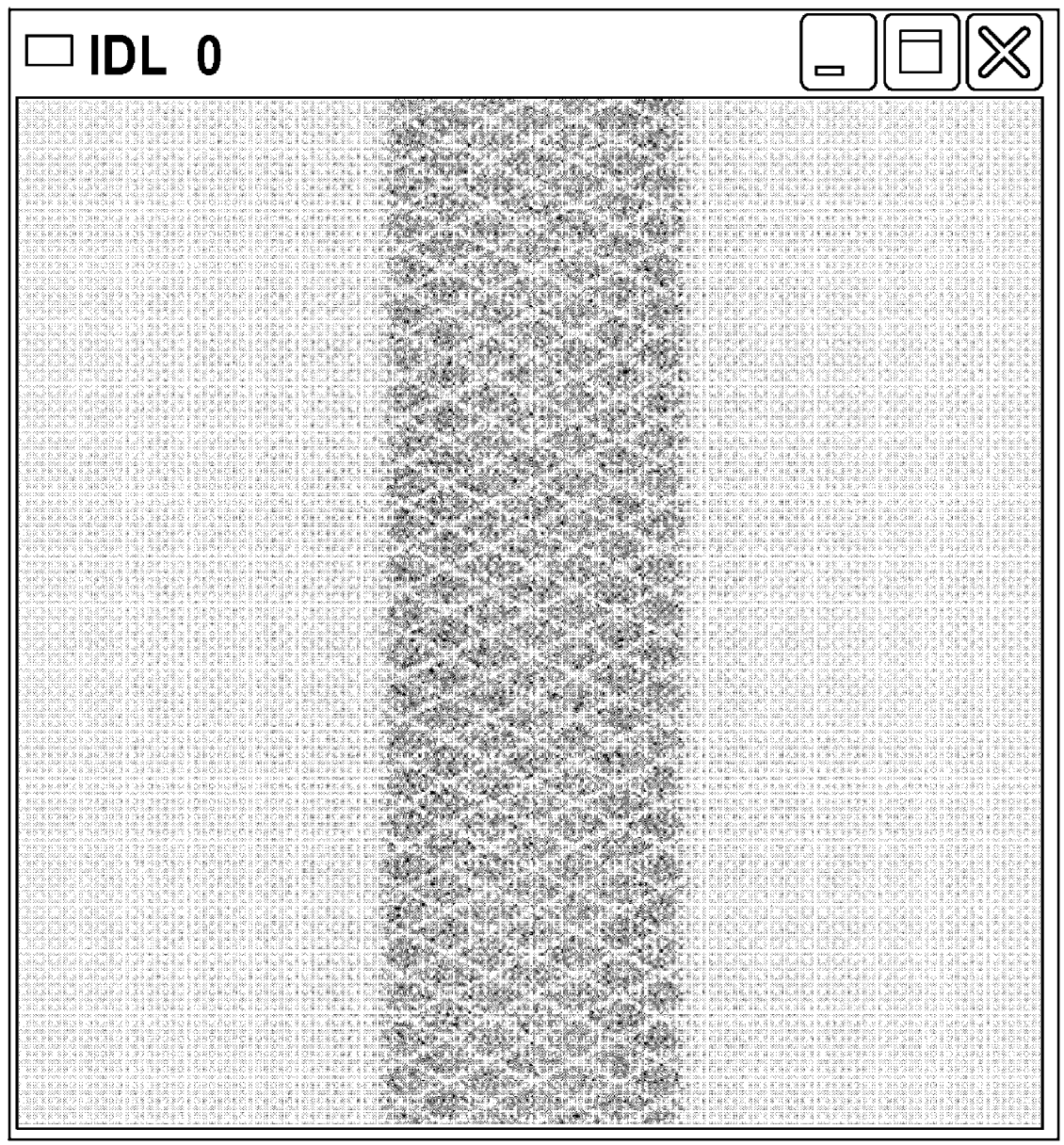
FIG. 2 shows an example of a slice of a uniform phantom sinogram.
Figure 3:
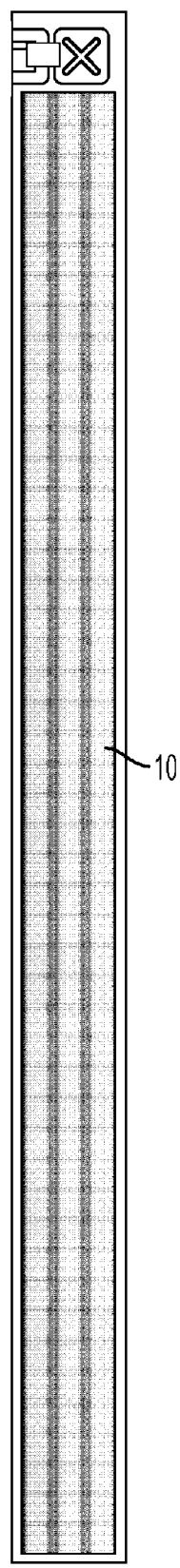
FIG. 3 shows an example of a key parameter in the form of a crystal efficiency array for the sinogram in FIG. 2.

At least one embodiment builds on using the prior knowledge that the phantom object 110 used in this study is a uniform cylinder phantom, and to establish a range of normal values for key parameters for this scan such as, for example, block uniformity, block efficiency, scanner sensitivity, randoms rate, and/or scatter fraction. For example, after a normalization procedure has acquired a uniform phantom sinogram, a quality check procedure loads this sinogram and computes these key parameters from this sinogram. An example of a slice of a uniform phantom sinogram is shown in FIG. 2. An example of a key parameter in the form of a crystal efficiency array is shown in FIG. 3 for this sinogram. In this specific embodiment the array shows that the crystal efficiency for all blocks 10 (144 of them in this example) are of satisfactory quality.

By comparing one or more key parameters instead of only a statistical value, for example the chi-square value, between the standard array and the acquired array from the uniform phantom sinogram, the quality of sinograms produced by the medical imaging device can be determined. If a key parameter deriving from the uniform phantom sinogram is outside a certain range, then the quality of the sinogram produced by the medical imaging device fails. However, if a key parameter is within a certain range, then the quality of the sinogram produced by the medical imaging device may be good enough. Consequently, the quality of the medical imaging device may be determined upon the produced sinogram quality.

At least one embodiment of the present invention checks other parameters than crystal efficiency as well. Parameters may include block uniformity, block efficiency, randoms rate, scanner efficiency, and/or scatter ratio. In some embodiments only some of these parameters may be used. In other embodiments all of the parameters (block uniformity, block efficiency, randoms rate, scanner efficiency, and scatter ratio) may be used. The advantage of checking all parameters is that any deficiency or abnormality with respect to the parameters may indicate the quality. In other words, the quality check is better the more parameters are used. In the exemplary test embodiments described herein all parameters have been used.

In at least one embodiment, comparing one or more key parameters may comprise checking detector block uniformity. Detector crystals may be arranged in blocks. For example thirteen by thirteen crystals may form a block. However, any number of crystals may be considered, such as for example eight by eight or thirty by thirty. For example, mean crystal efficiency averaged over all blocks may be obtained and for each of the blocks the root mean square error (RMSE) may be calculated based on the mean crystal efficiency. Consequently, blocks having a RMSE outside a pre-set range may be detected.

In at least one embodiment, comparing one or more key parameters may comprise checking detector block efficiency. Based on the mean crystal efficiency averaged over all blocks the block efficiency for each block may be obtained. Blocks having an efficiency outside a pre-set range may be detected. The range may be determined based on a mean value plus/minus a selected threshold.

In at least one embodiment, comparing one or more key parameters may comprise checking randoms rate. The randoms rate may be calculated as the total numbers of LORs during the coincidence window times the square of the single event rate per crystal. The total numbers of LORs during the coincidence window may be taken from the specifics of the uniform phantom object used in the specific medical imaging device, while the singles rate may be obtained from the PET gantry hardware, for example from the header of the uniform phantom sinogram. The rate may preferably be within a range based on the randoms rate from the uniform phantom sinogram plus/minus a selected threshold.

One embodiment may use a known uniform phantom object and may calculate the randoms rate for that known uniform phantom object. By placing the known uniform phantom object in the field of view of a medical imaging device the randoms rate can be measured. The calculated randoms rate versus the measured randoms rate may be computed and if the rates are too far apart the quality of the sinograms produced by the medical imaging device may not be of a good quality. For example, the single rate may be reported incorrectly or the coincident window may be set wrong.

In at least one embodiment, comparing one or more key parameters may comprise checking scanner efficiency. Scanner efficiency of a medical imaging device may be calculated as the total number of true events over a specific scan time divided by an amount of activity in the field of view. The total number of true events may be taken from the sinogram, the scan time may be taken from the header of the sinogram, and the amount of activity in the field of view may be taken from a patient database. The scanner efficiency may then be compared to a known value (distribution) relating to the specifics of the uniform phantom object used in the specific medical imaging device. The scanner efficiency may preferably be within a range based on the known scanner efficiency from the uniform phantom sinogram plus/minus a selected threshold. If the scanner efficiency is outside the range, then the medical imaging device may not be set up correctly, the electronics may not be tuned as they should, incorrect set-up data may be used, and/or too much electronic noise may exist within the medical imaging device.

In at least one embodiment, comparing one or more key parameters may comprise checking scatter ratio. Scatter ratio of a medical imaging device may be computed during scatter calculated from normalization as, for example, scatter events ratio compared to the total events ratio. The scatter ratio may then be compared to a known value (distribution) relating to the specifics of the uniform phantom object used in the specific medical imaging device. The scatter ratio may preferably be within a range based on the known scatter ratio from the uniform phantom sinogram plus/minus a selected threshold. If the scatter ratio is outside the range, then the medical imaging device may operate with a wrong energy window, and/or something may be in the field of view.

At least one embodiment modifies a daily quality check procedure so it analyzes the uniform sinogram acquired in normalization procedure to report the system quality. In this way the check procedure does not need to re-acquire data. Hereby the acquisition time can be shorten to half. Such embodiments may examine more characteristics of a PET or PET/CT system.

First Exemplary Test Embodiment

In this first exemplary test embodiment a scanner with one weak block was simulated. Detector crystals may be arranged in blocks. For example thirteen by thirteen crystals may form a block. While previous method may have considered all blocks, an embodiment of this method may consider each individual block.

A single weak block may be detected with an embodiment of the invention. There may be, for example, 144 blocks or even more in a scanner. If one block is not working correctly, then less than one percent of the data is incorrect if a statistical value is considered. Therefore, if a statistical value of the total between the two crystal efficiencies is compared, then the one block not working correctly may not be detected. This may in turn lead to a pass quality check and sinograms comprising bad artifacts.

Figure 4:
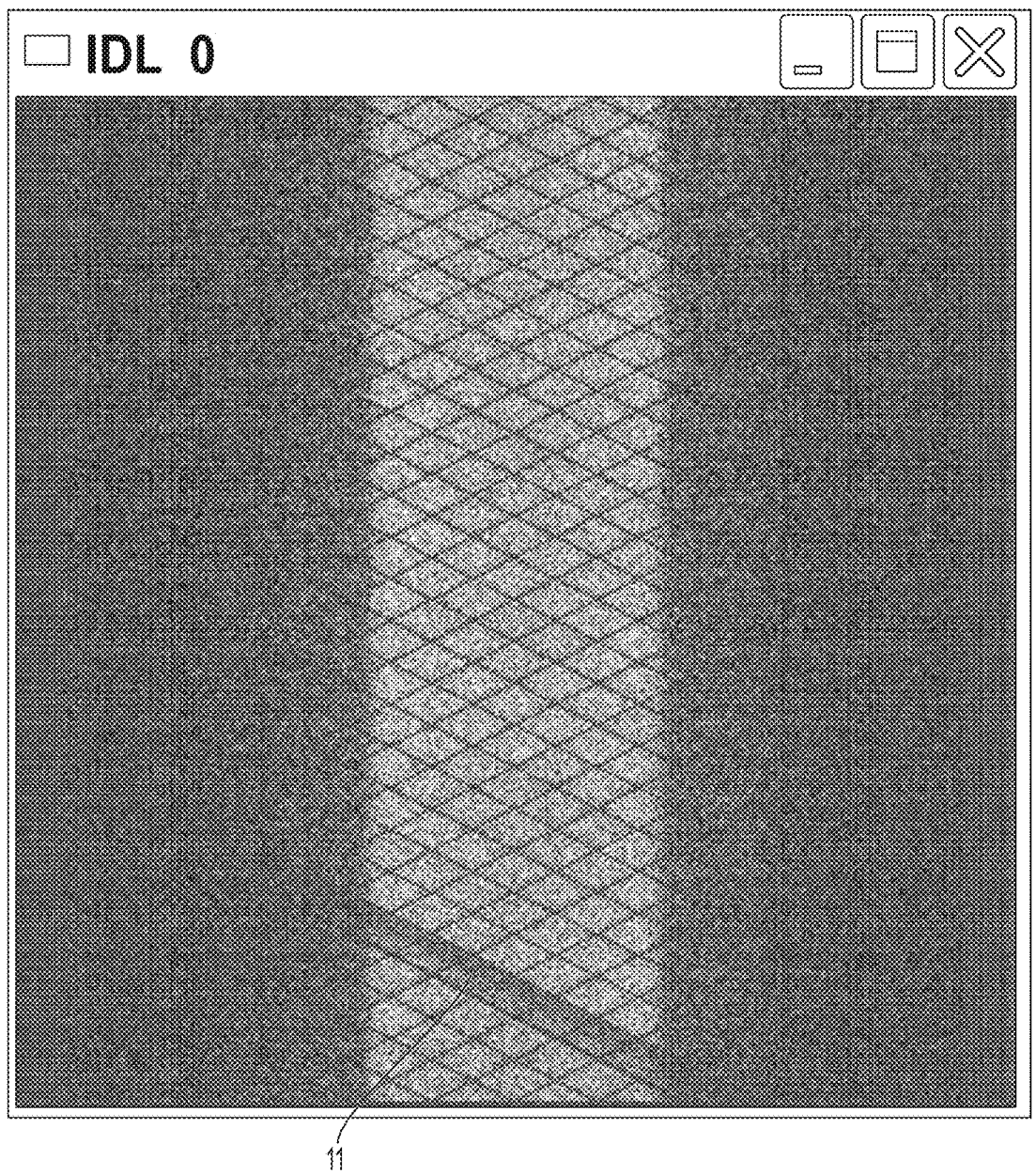
FIG. 4 shows an exemplary embodiment of a test case of a sinogram acquired with one block having a lower crystal efficiency than the other blocks.

An exemplary embodiment of a test case is illustrated schematically by FIG. 4 and shows a sinogram acquired with one block having a lower crystal efficiency than the other blocks. The weak block is indicated in the sinogram in FIG. 4 as a black stripe 11.

Figure 5:
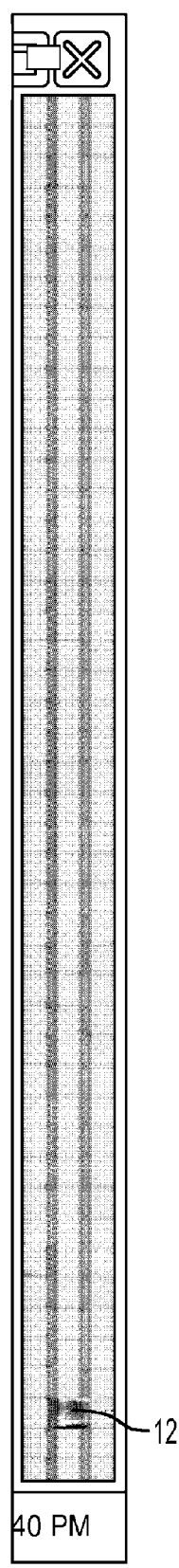
FIG. 5 shows an exemplary embodiment of a key parameter for the sinogram in FIG. 4.

The computed crystal efficiency array of this sinogram is illustrated schematically by FIG. 5. Here the weak block 12 can be identified as a darker square in the array.

In previous methods working on a statistical value, for example the chi-square value, the crystal efficiency array shown in FIG. 4 would have had a chi-square value of about 2. This may lead an engineer to set a thresh hold for the chi-square value of about 10, meaning a sinogram with a chi-square value of less than 10 would indicate an acceptable quality. The chi-square value of the crystal efficiency array in FIG. 5 would certainly be lower that 10. Therefore, while embodiments of the method would pick this up, present methods would not and would pass the array in FIG. 5 under a statistical value test, such as the chi-square test.

Figure 6:
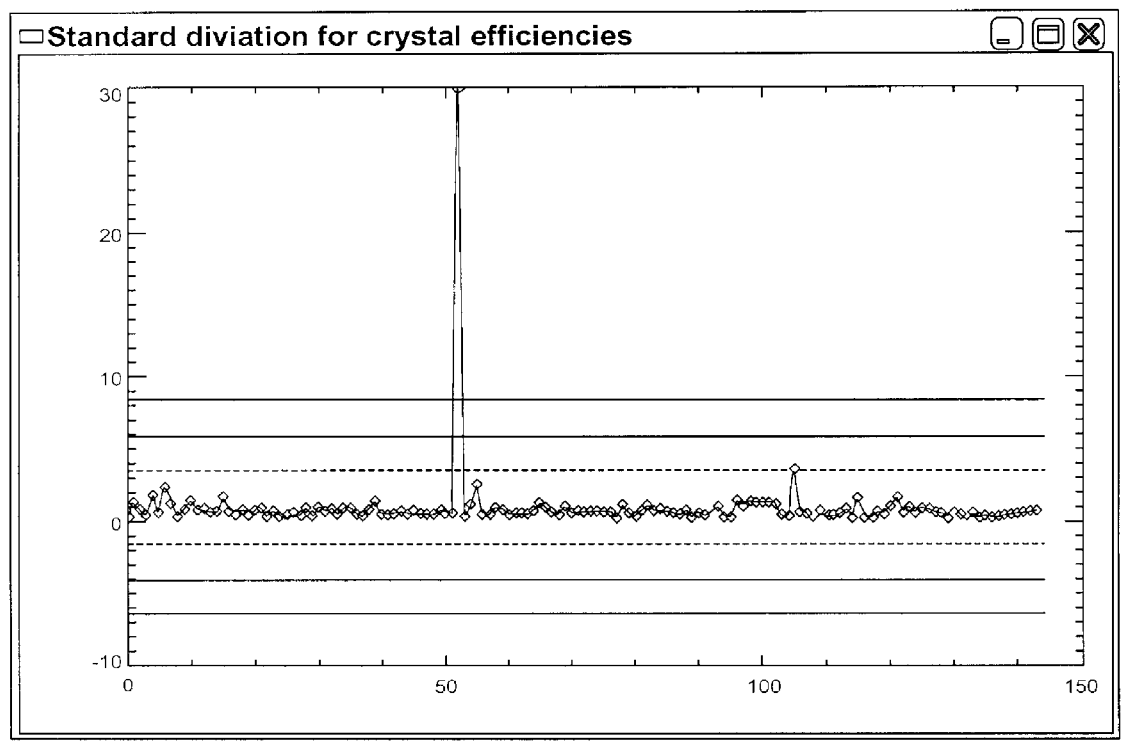
FIG. 6 shows an exemplary embodiment of a test of block uniformity between blocks as standard deviation for crystal efficiencies for the sinogram in FIG. 4.

With regard to block uniformity, uniformity in crystal efficiency between blocks is shown in FIG. 6 as standard deviation for crystal efficiencies. In this example it can be seen that one block has much higher noise than the remaining blocks. Here it is more than the exemplary pre-set value of 10. Consequently, an embodiment of the present method would detect the difference and indicate that the quality of the sinogram produced by the medical imaging device is not good enough.

Figure 7:
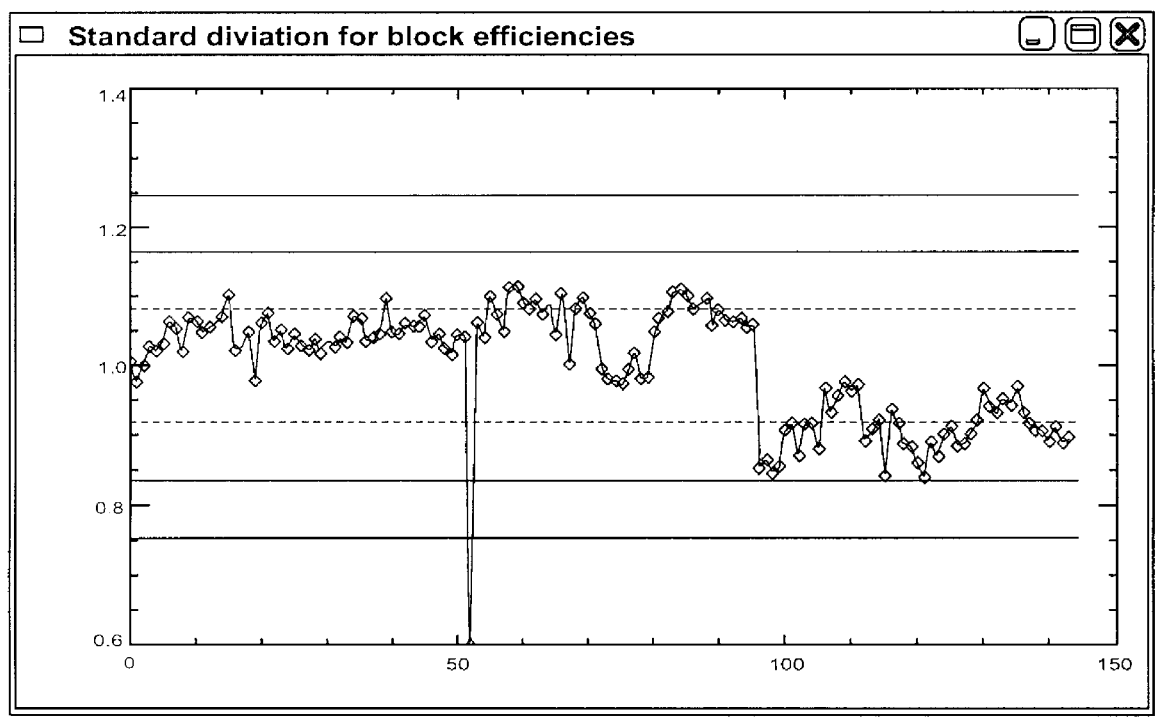
FIG. 7 shows an exemplary embodiment of a test of block efficiency between blocks as standard deviation for block efficiencies for the sinogram in FIG. 4.

A test of block efficiency is shown in FIG. 7 as standard deviation for block efficiencies. In this example it can be seen that one block has much lower efficiency than the remaining blocks. Here it is lower than the exemplary pre-set value of 20% of the other blocks. Consequently, an embodiment of the present method would detect the difference and indicate that the quality of the sinogram produced by the medical imaging device is not good enough.

Turning to the randoms rate, the estimated randoms was in this example about 31788.537, while the measured randoms was about 30545.215. The calculated difference in percent is about 4.07 percent. This is within a pre-set range of +/−15 percent. Consequently, in this example, the quality of the sinogram produced by the medical imaging device is good enough.

Turning to scanner efficiency, the calculated scanner efficiency (trues/time/activity*100) related to the total true events taken from the sinogram, the scanning time is taken from the header of the sinogram, and the activity from the patient database, amounts to about 0.30 (cts/sec/Bq). With a pre-set range of +/−30% of a pre-set value, in this example 0.38, the key parameter of the scanner efficiency is within the pre-set range. Consequently, in this example, the quality of the sinogram produced by the medical imaging device is good enough.

Turning to scatter ratio, the scatter ratio is computed during scatter calculated from normalization in the exemplary embodiment. Here the scatter ratio was about 31.95 percent. With a pre-set range of +/−30% of a pre-set value of the gantry model default value, in this example 0.28, the key parameter of the scatter ratio is within the pre-set range. A gantry model default value is known for a certain medical imaging device and may be acquiring an average value by scanning a uniform phantom object on the same model type of machines for many times. Consequently, in this example, the quality of the sinogram produced by the medical imaging device is good enough.

Figure 8:
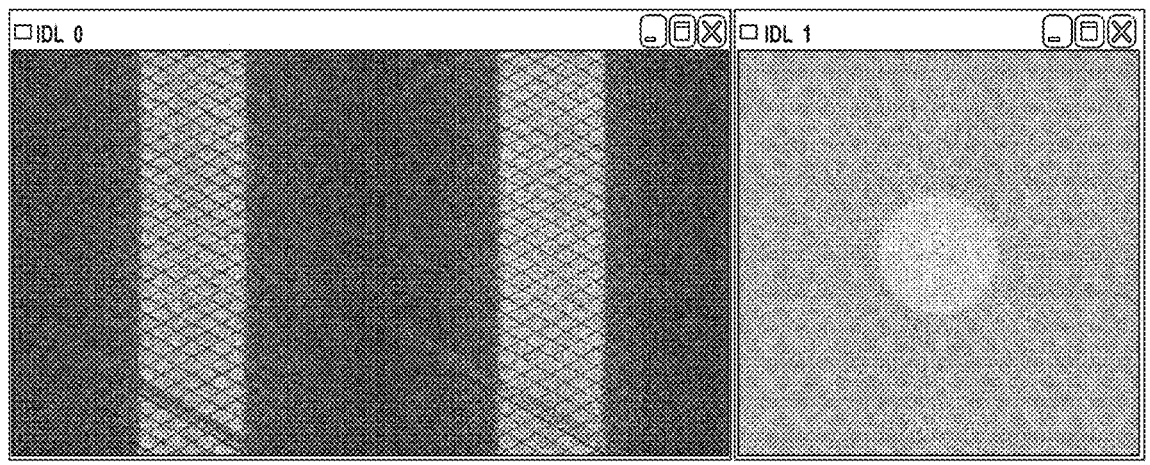
FIG. 8 shows an exemplary embodiment of a test, with the raw sinogram of FIG. 4 and a normalized sinogram to the left, and a reconstructed image with artifacts from the weak block from the sinogram in FIG. 4.

The over all result from this exemplary test embodiment with a weak block, the resulting raw sinogram and a normalized sinogram are shown in the left part of FIG. 8. It may be appreciated that after normalization this weak block may still be visible. The resulting artifacts produced by this weak block may end up in the reconstructed image as shown in the right part of FIG. 8.

Second Exemplary Test Embodiment

Figure 9:
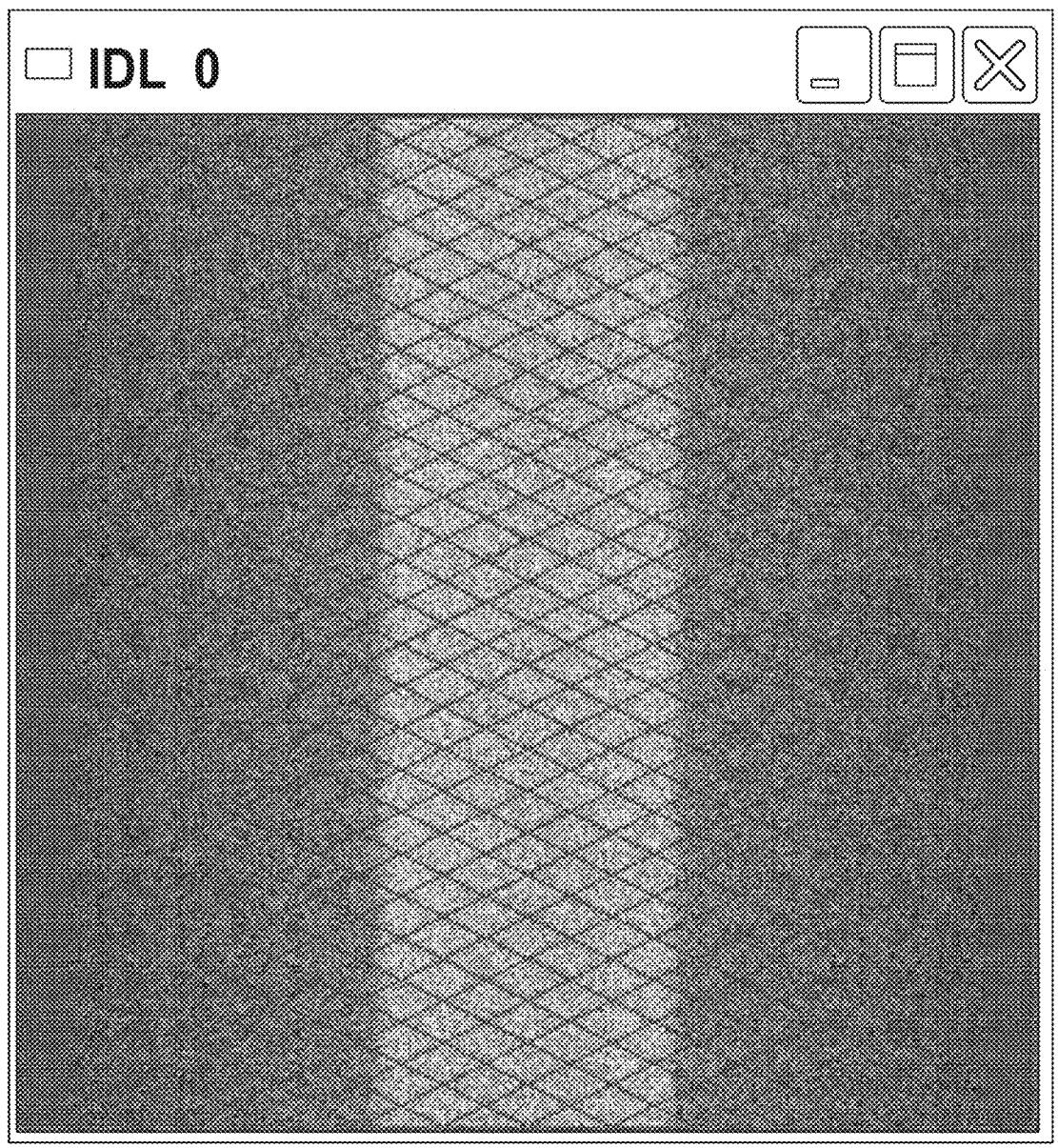
FIG. 9 shows an exemplary embodiment of a test case of a sinogram acquired in a scanner working with a low level discriminators.

In this second exemplary test embodiment a scanner working with measurements taken with a lower level discriminators (LLD) of 325 keV was simulated. A normal value for LLD may be 425 keV. An exemplary embodiment of this test case is illustrated schematically by FIG. 9 and shows a sinogram acquired with a LLD of 325 keV.

Figure 10:
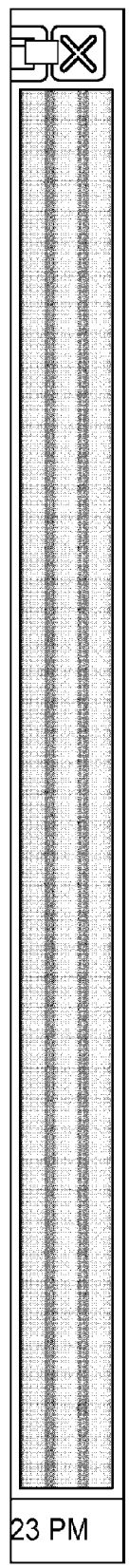
FIG. 10 shows an exemplary embodiment of a key parameter for the sinogram in FIG. 9.

The computed crystal efficiency array of this sinogram is illustrated schematically by FIG. 10. Here the blocks can be identified as squares in the array.

In mentioned previous methods working on a statistical value, for example the chi-square value, the crystal efficiency array shown in FIG. 10 would have had a chi-square value of about 0.96. With a thresh hold for the chi-square value of about 10, the chi-square value of the crystal efficiency array in FIG. 10 would certainly be lower that 10. Consequently a medical imaging device operating with a LLD of 325 keV would not be caught by the mentioned previous methods working on a statistical value of crystal efficiency.

Figure 11:
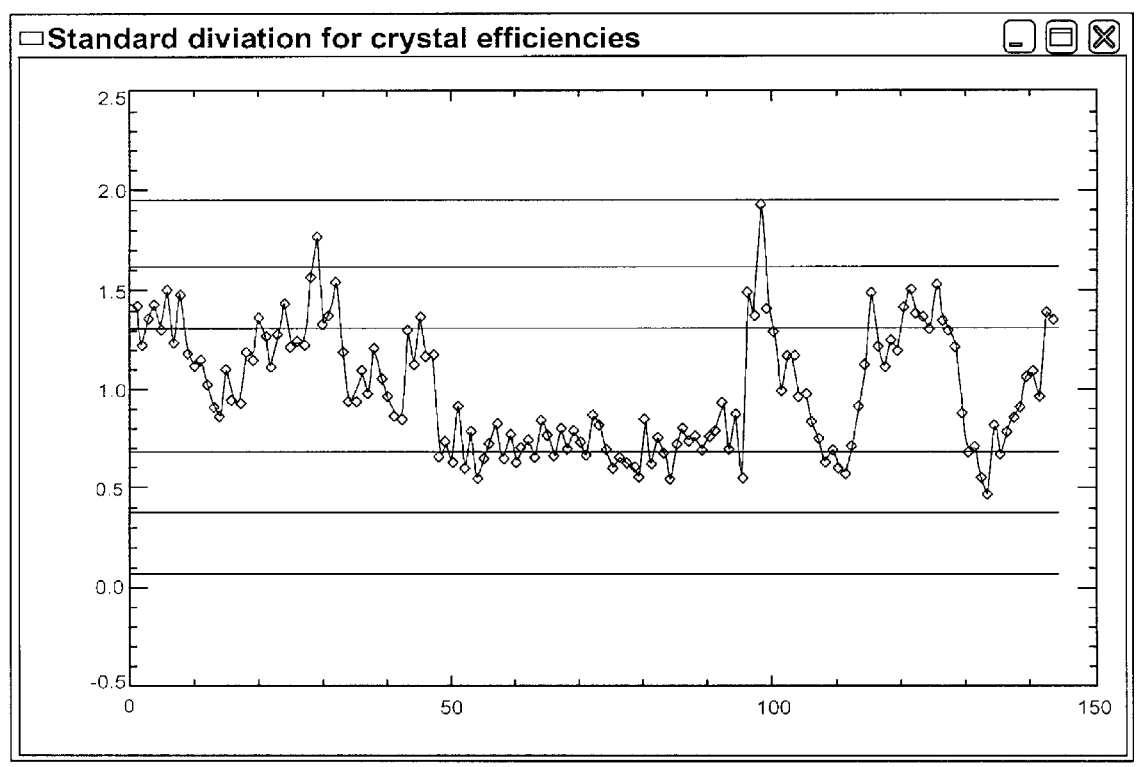
FIG. 11 shows an exemplary embodiment of a test of block uniformity between blocks as standard deviation for crystal efficiencies for the sinogram in FIG. 9.

Turning to block uniformity, uniformity in crystal efficiency between blocks is shown in FIG. 11 as standard deviation for crystal efficiencies. In this example it can be seen that all blocks have a lower noise than the exemplary pre-set value of 10. Consequently, an embodiment of the present method would detect uniformity between the blocks and indicate that the quality of the sinogram produced by the medical imaging device is good enough.

Figure 12:
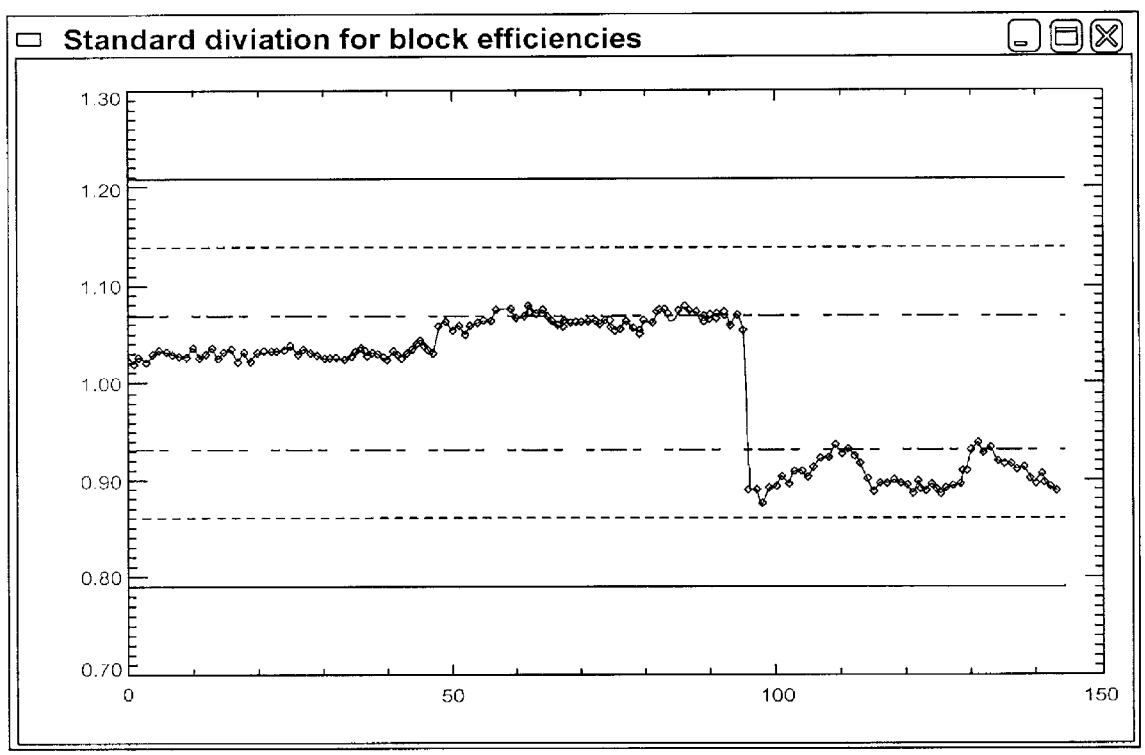
FIG. 12 shows an exemplary embodiment of a test of block efficiency between blocks as standard deviation for block efficiencies for the sinogram in FIG. 9.

A test of block efficiency is shown in FIG. 12 as standard deviation for block efficiencies. In this example it can be seen that all blocks are within the exemplary pre-set value of 20% of the other blocks. Consequently, an embodiment of the present method would detect uniformity between the blocks and indicate that the quality of the sinogram produced by the medical imaging device is good enough.

Turning to the randoms rate, the estimated randoms was in this example about 51404.705, while the measured randoms was about 50469.103. The calculated difference in percent is about 1.85 percent. This is within a pre-set range of +/−15 percent. Consequently, in this example, the quality of the sinogram produced by the medical imaging device is good enough.

Turning to scanner efficiency, the calculated scanner efficiency (trues/time/activity*100) related to the total true events taken from the sinogram, the scanning time is taken from the header of the sinogram, and the activity from the patient database, amounts to about 0.36 (cts/sec/Bq). With a pre-set range of +/−30% of a pre-set value, in this example 0.38, the key parameter of the scanner efficiency is within the pre-set range. Consequently, in this example, the quality of the sinogram produced by the medical imaging device is good enough.

Turning to scatter ratio, the scatter ratio is computed during scatter calculated from normalization in the exemplary embodiment. Here the scatter ratio was about 48.64 percent. With a pre-set range of +/−30% of a pre-set value of the gantry model default value, in this example 0.28, the key parameter of the scatter ratio is outside the pre-set range. Consequently, in this example, the quality of the sinogram produced by the medical imaging device is not good enough.

Figure 13:
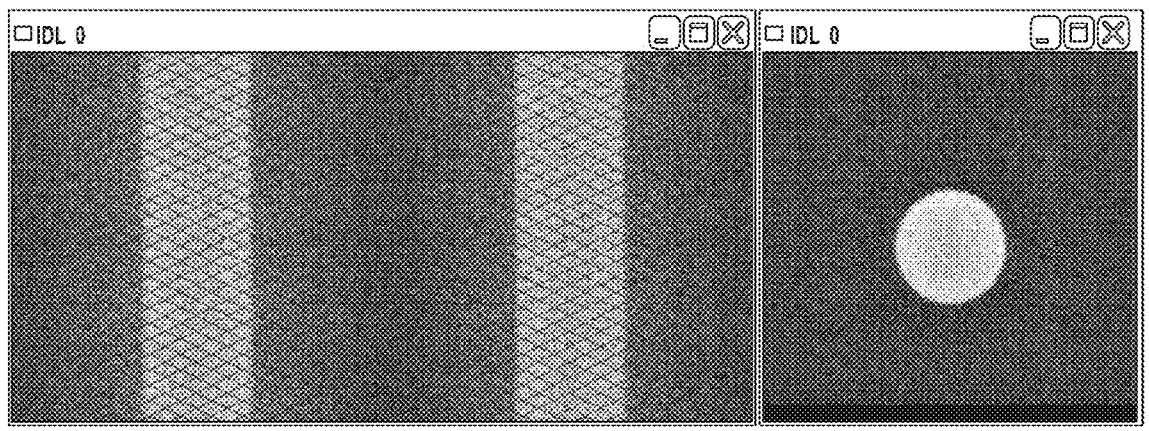
FIG. 13 shows an exemplary embodiment of the raw sinogram of FIG. 9 and a normalized sinogram to the left, and a reconstructed image with artifacts from the sinogram in FIG. 9.
Figure 14:
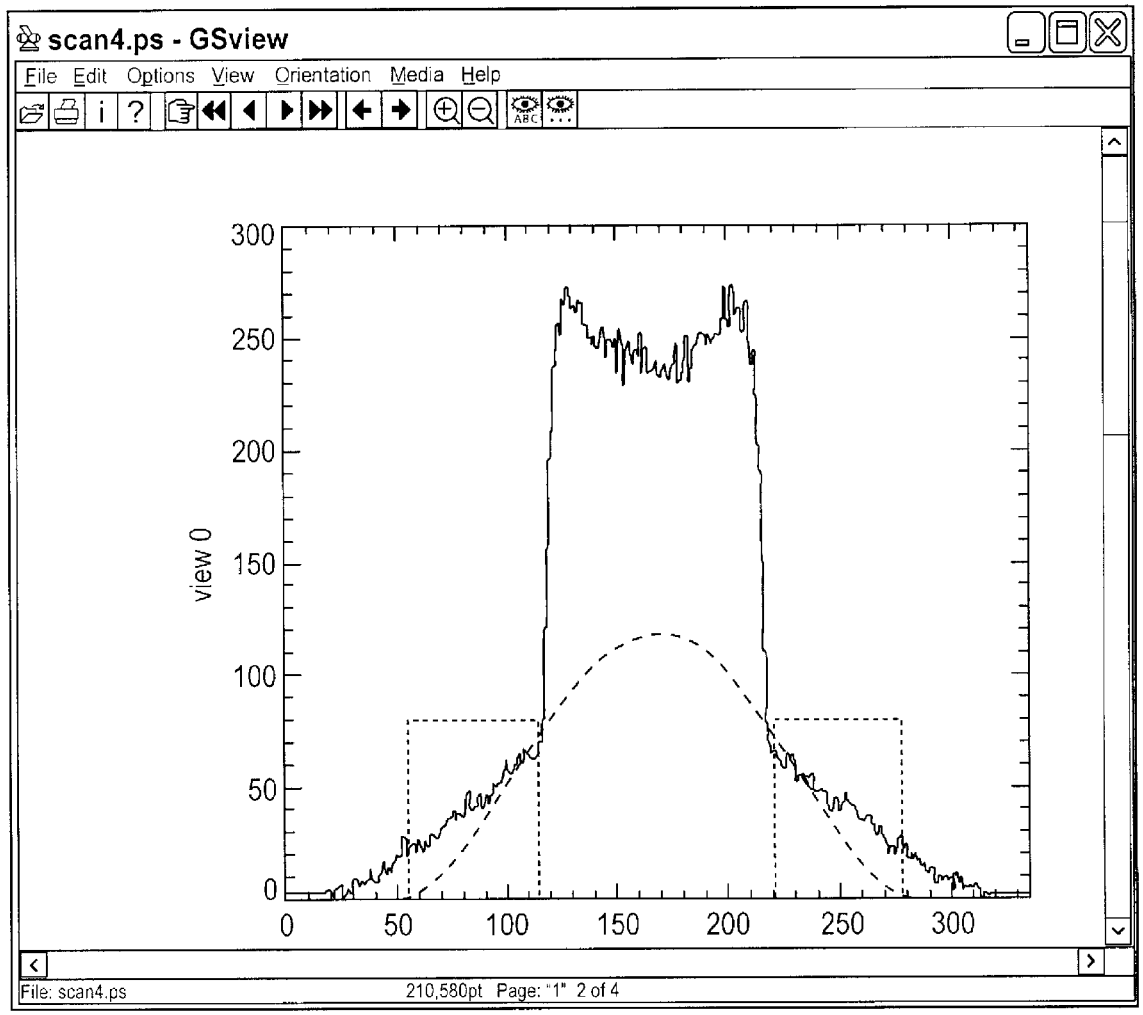
FIG. 14 shows an exemplary embodiment of a plot of the reconstructed image as shown in the right part of FIG. 13.

The over all result from this exemplary test embodiment with a LLD that is too low is shown in the left part of FIG. 13, with the resulting raw sinogram to the left and a normalized sinogram to the right. The resulting artifacts produced by this too low LLD may end up in the reconstructed image as shown in the right part of FIG. 13. FIG. 14 shows a plot of the reconstructed image as shown in the right part of FIG. 13. It may be appreciated that the wrong LLD causes the wrong shape of the scatter tails.

Third Exemplary Test Embodiment

Figure 15:
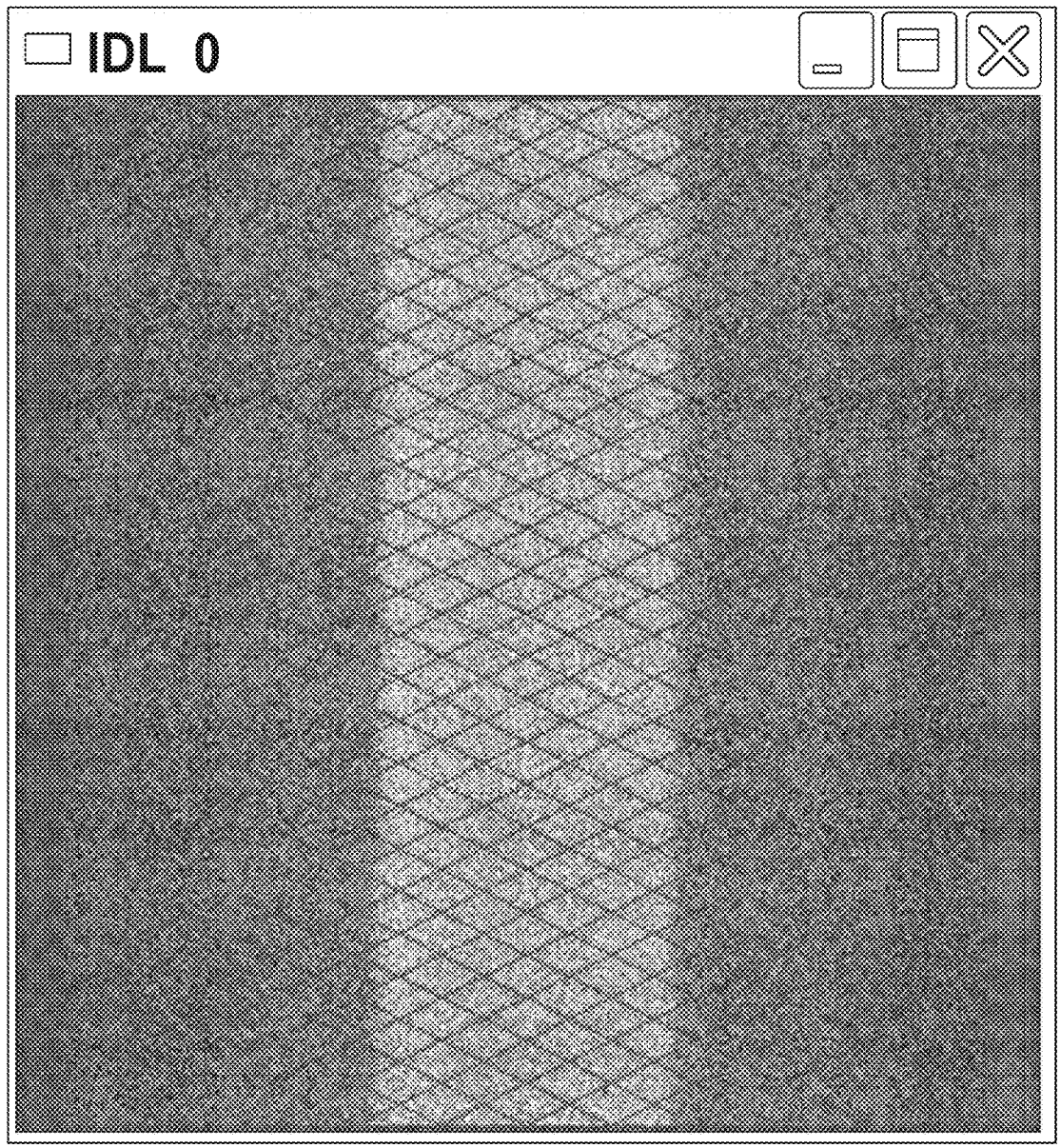
FIG. 15 shows an exemplary embodiment of a test case of a sinogram acquired with a too long coincidence window.

In a third exemplary test embodiment a scanner working with a too long coincidence window, set to 10 ns, was simulated. A normal value for a coincidence window may be 4 ns. An exemplary embodiment of this test case is illustrated schematically by FIG. 15 and shows a sinogram acquired with a coincidence window of 10 ns.

Figure 16:
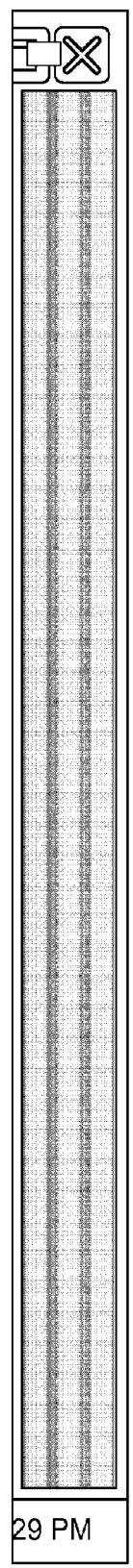
FIG. 16 shows an exemplary embodiment of a key parameter for the sinogram in FIG. 15.

The computed crystal efficiency array of this sinogram is illustrated schematically by FIG. 16. Here the blocks can be identified as squares in the array.

In mentioned previous methods working on a statistical value, for example the chi-square value, the crystal efficiency array shown in FIG. 16 would have had a chi-square value of about 0.89. With a thresh hold for the chi-square value of about 10, the chi-square value of the crystal efficiency array in FIG. 16 would certainly be lower that 10. Consequently a medical imaging device operating with a too long coincidence window would not be caught by the mentioned previous methods working on a statistical value of crystal efficiency.

Figure 17:
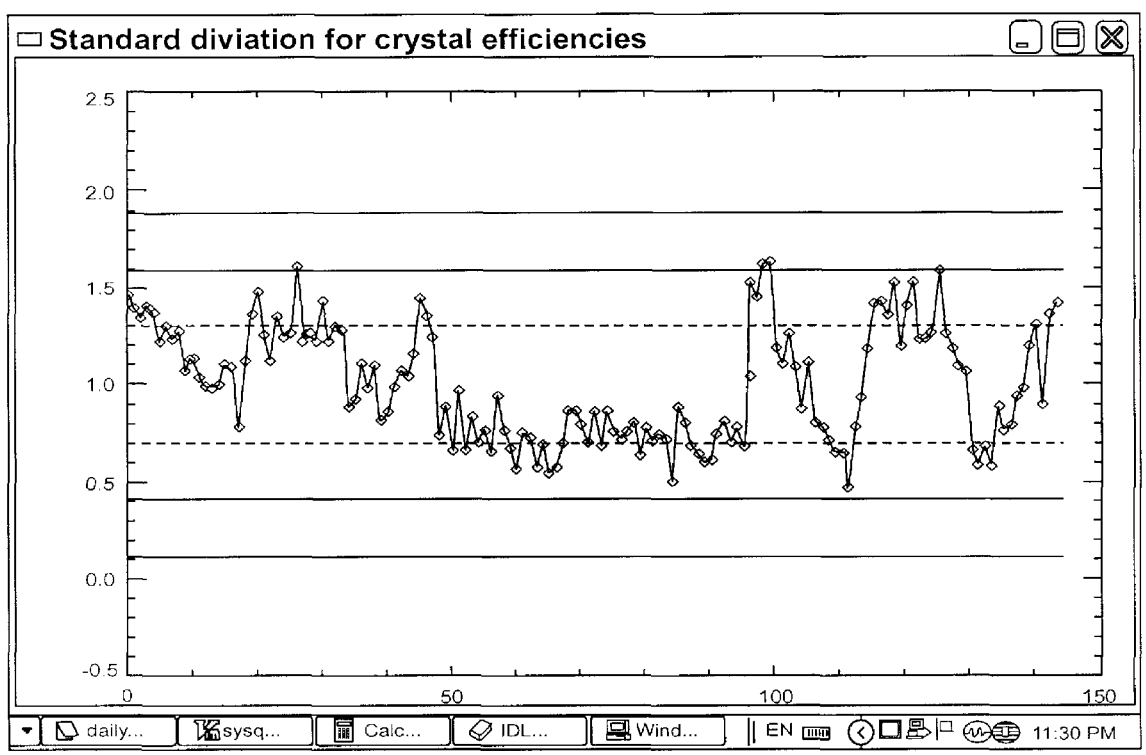
FIG. 17 shows an exemplary embodiment of a test of block uniformity between blocks as standard deviation for crystal efficiencies for the sinogram in FIG. 15.

Turning to block uniformity, uniformity in crystal efficiency between blocks is shown in FIG. 17 as standard deviation for crystal efficiencies. In this example it can be seen that all blocks has a lower noise than the exemplary pre-set value of 10. Consequently, an embodiment of the present method would detect uniformity between the blocks and indicate that the quality of the sinogram produced by the medical imaging device is good enough.

Figure 18:
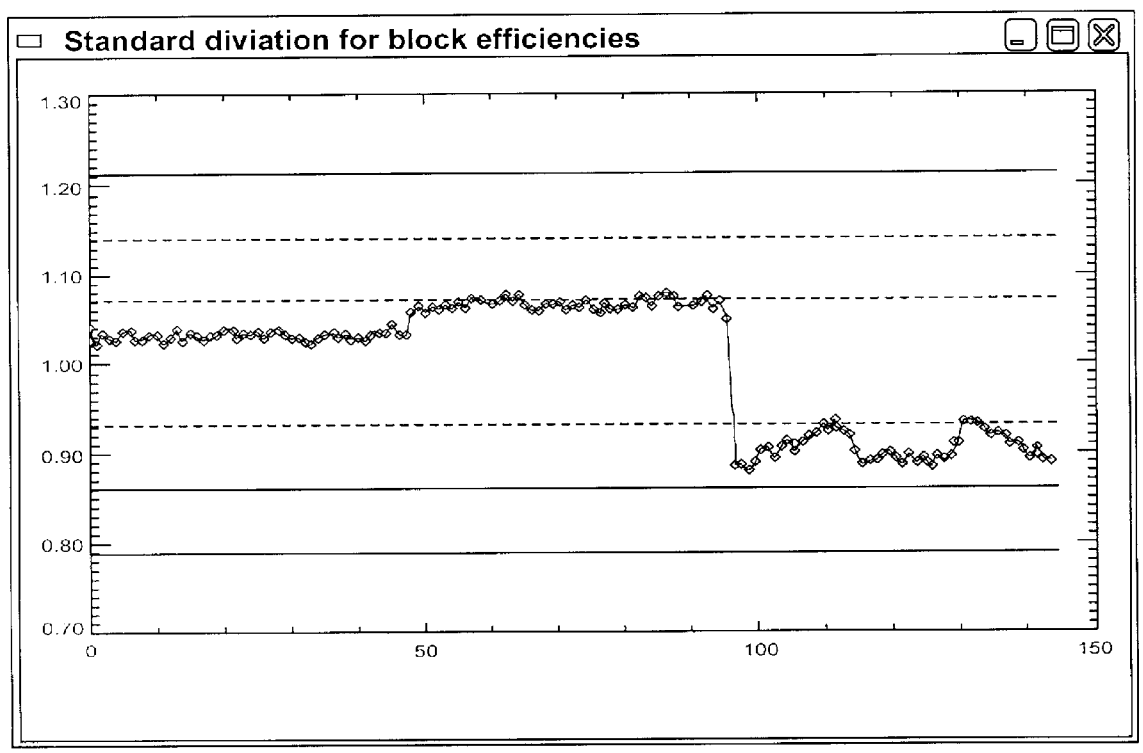
FIG. 18 shows an exemplary embodiment of a test of block efficiency between blocks as standard deviation for block efficiencies for the sinogram in FIG. 15.

A test of block efficiency is shown in FIG. 18 as standard deviation for block efficiencies. In this example it can be seen that all blocks are within the exemplary pre-set value of 20% of the other blocks. Consequently, an embodiment of the present method would detect uniformity between the blocks and indicate that the quality of the sinogram produced by the medical imaging device is good enough.

Turning to the randoms rate, the estimated randoms was in this example about 54066.197, while the measured randoms was about 118803.96. The calculated difference in percent is about −54.49 percent. This is outside a pre-set range of +/−15 percent. Consequently, in this example, the quality of the sinogram produced by the medical imaging device is not good enough.

Turning to scanner efficiency, the calculated scanner efficiency (trues/time/activity*100) related to the total true events taken from the sinogram, the scanning time is taken from the header of the sinogram, and the activity from the patient database, amounts to about 0.37 (cts/sec/Bq). With a pre-set range of +/−30% of a pre-set value, in this example 0.38, the key parameter of the scanner efficiency is within the pre-set range. Consequently, in this example, the quality of the sinogram produced by the medical imaging device is good enough.

Turning to scatter ratio, the scatter ratio is computed during scatter calculated from normalization in the exemplary embodiment. Here the scatter ratio was about 35.0 percent. With a pre-set range of +/−30% of a pre-set value of the gantry model default value, in this example 0.28, the key parameter of the scatter ratio is inside the pre-set range. Consequently, in this example, the quality of the sinogram produced by the medical imaging device is good enough.

Figure 19:
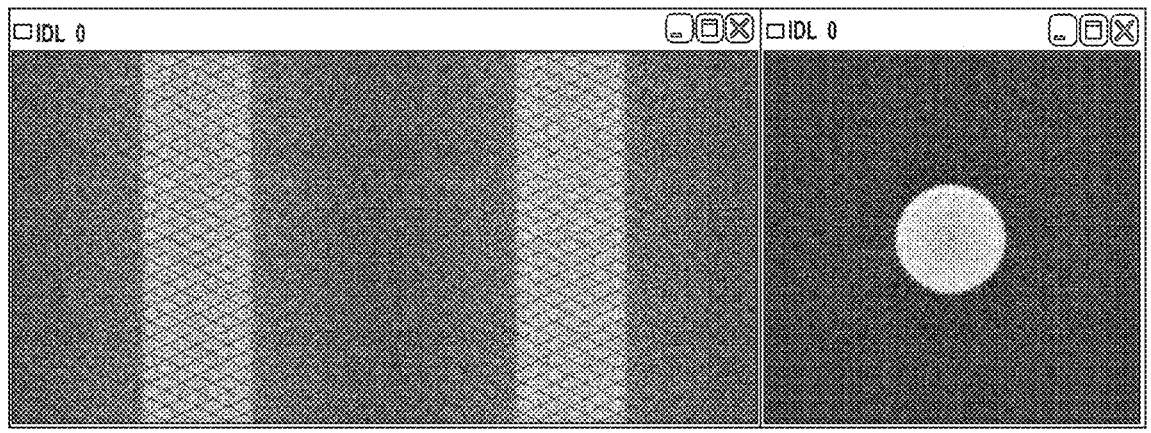
FIG. 19 shows an exemplary embodiment of the raw sinogram of FIG. 15 and a normalized sinogram to the left, and a reconstructed image with artifacts from the sinogram in FIG. 15 to the right.
Figure 20:
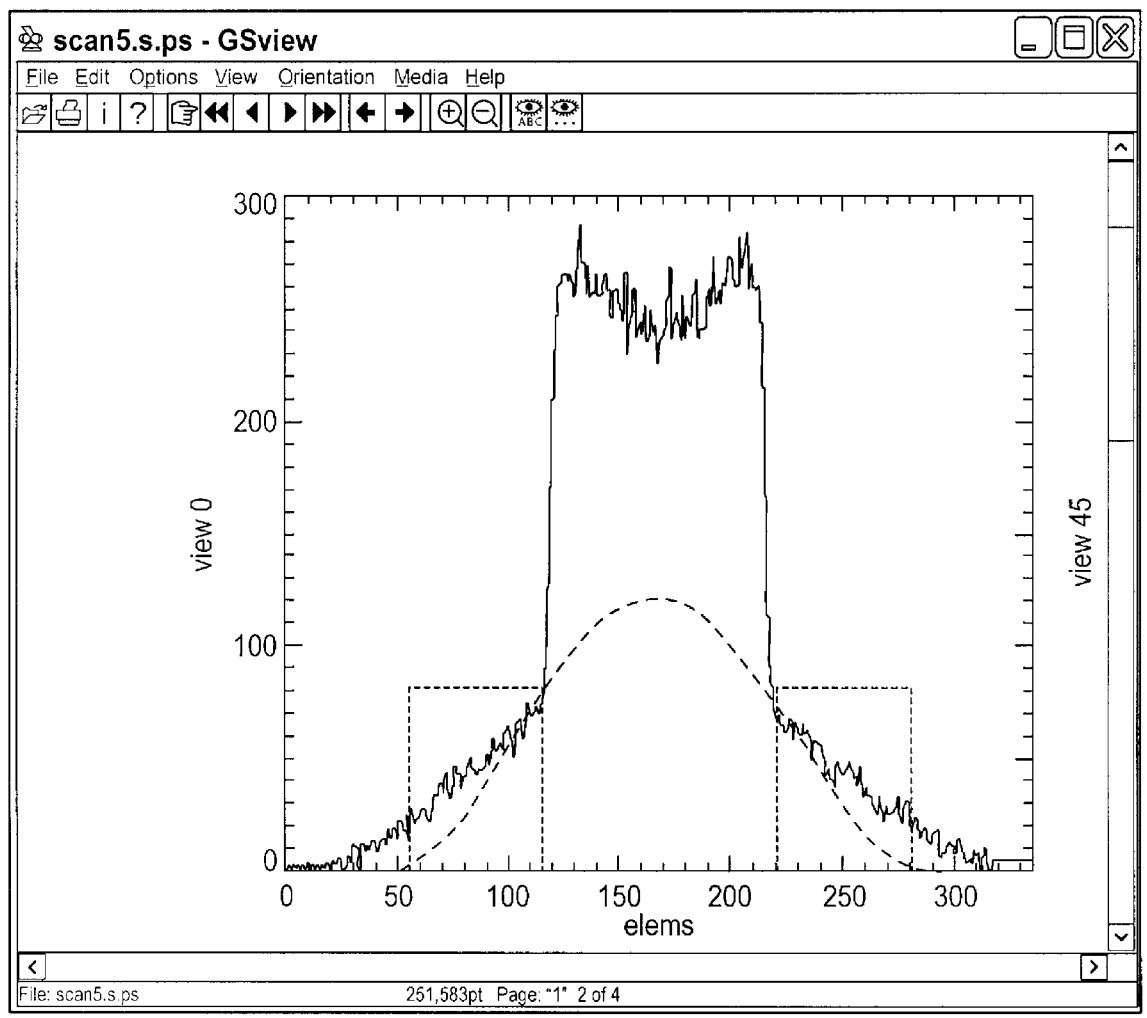
FIG. 20 shows an exemplary embodiment of a plot of the reconstructed image as shown in the right part of FIG. 19.

The over all result from this exemplary test embodiment with a too long coincidence window is shown in the left part of FIG. 19, with the resulting raw sinogram to the left and a normalized sinogram to the right. The resulting artifacts produced by this too long coincidence window may end up in the reconstructed image as shown in the right part of FIG. 19. FIG. 20 shows a plot of the reconstructed image as shown in the right part of FIG. 19. It may be appreciated that the shape of the extra randoms cause problem in scatter fitting.

Figure 21:
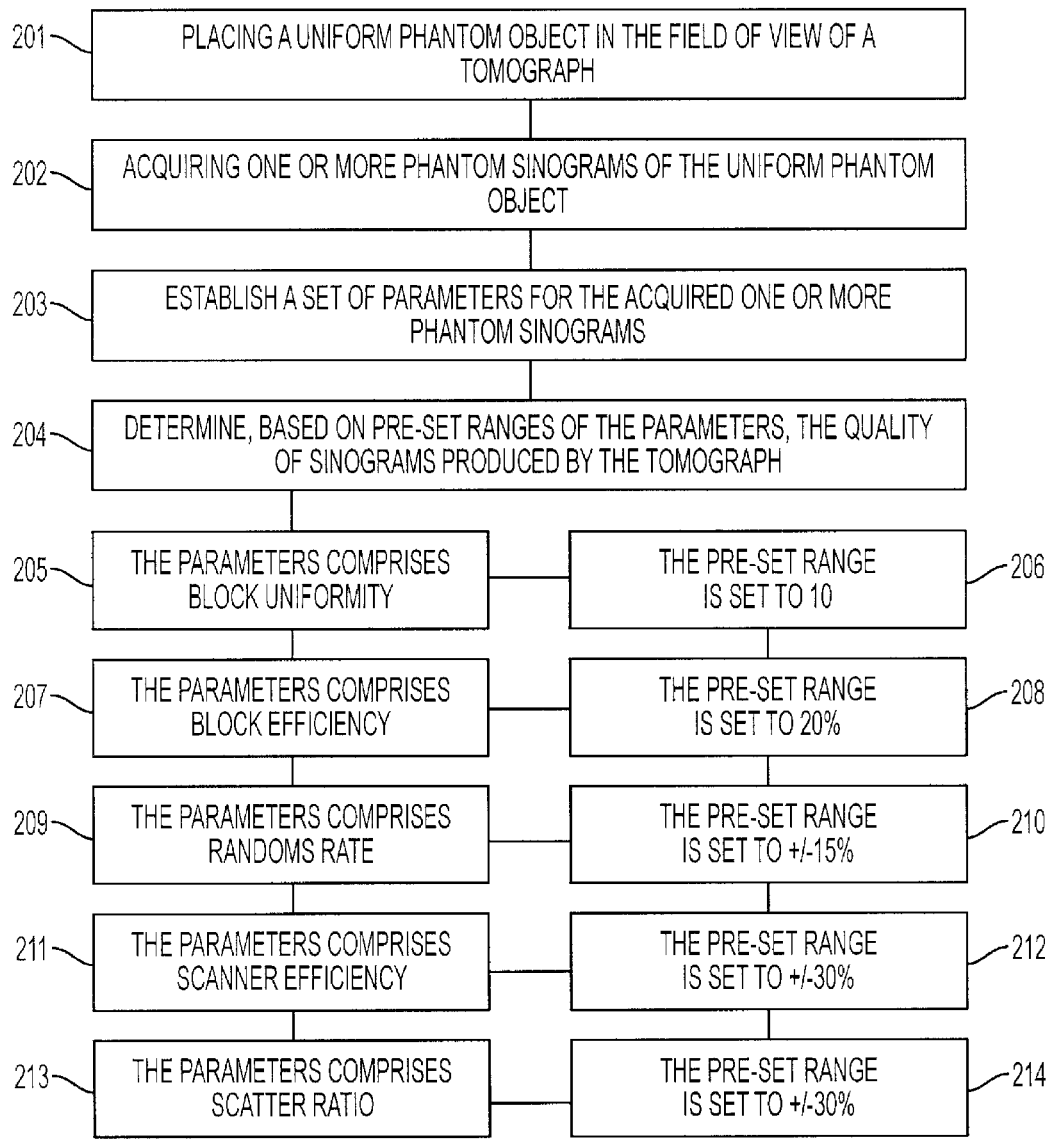
FIG. 21 shows an exemplary embodiment of a flow chart outlining an embodiment of a method for determining quality of sinograms produced by a medical imaging device.

Turning to FIG. 21, an exemplary embodiment of a flow chart outlining an embodiment of a method for determining quality of sinograms produced by a medical imaging device is shown. The embodiment shown may apply to a positron emission tomograph as well as a positron emission tomograph combined with computed tomograph for X-ray. In this embodiment, a method for determining quality of sinograms produced by a medical imaging device may comprise the following steps. Placing a uniform phantom object in the field of view of the medical imaging device as indicated in step 201. Acquiring one or more phantom sinograms of the uniform phantom object as indicated in step 202. Establish a set of parameters for the acquired one or more phantom sinograms as indicated in step 203. Determine, based on pre-set ranges of the parameters, the quality of sinograms produced by the medical imaging device as indicated in step 204. As may be taken from steps 205 to 214, the parameters may include one or more parameters of a group of parameters consisting of block uniformity, block efficiency, randoms rate, scanner efficiency, and scatter ratio.

Establishing the block uniformity may be done by obtaining mean crystal efficiency averaged over all blocks in the medical imaging device and calculating for each of the blocks the root mean square error (RMSE) based on the mean crystal efficiency, as indicated in step 205. The quality of sinograms produced by the medical imaging device may be determined in relation to the RMSE of each block being inside or outside a pre-set range of, for example, 10 as indicated in step 206.

Establishing the block efficiency may be done by calculating the block efficiency for each block based on the mean crystal efficiency averaged over all blocks as indicated in step 207. The quality of sinograms produced by the medical imaging device may be determined in relation to the block efficiency of each block being inside or outside a pre-set range of, for example, 20 percent, as indicated in step 208.

Establishing the randoms rate efficiency may be done by calculating total numbers of line of responses (LORs) during a coincidence window and multiply the total numbers of LORs with the square of the singles rate per crystal as indicated in step 209. The quality of sinograms produced by the medical imaging device may be determined in relation to the randoms rate being inside or outside a pre-set range of, for example, plus/minus 15 percent as indicated in step 210.

Establishing the scanner efficiency may be done by calculating the total number of true events over a specific scan time divided by an amount of activity in the field of view as indicated in step 211. The quality of sinograms produced by the medical imaging device may be determined in relation to the scanner efficiency being inside or outside a pre-set range of, for example, plus/minus 30 percent as indicated in step 212.

Establishing the scatter ratio may be done by calculating the scatter ratio as scatter events compared to total events as indicated in step 213. The quality of sinograms produced by the medical imaging device may be determined in relation to the scatter ratio being inside or outside a pre-set range of, for example, plus/minus 30 percent as indicated in step 214.

Embodiments of the described method and system described above for PET may also be applied to PET/CT. Embodiments of the quality check method and device may analyze the uniform sinogram acquired in normalization procedure to report the system quality. In this way the quality check method does not need to re-acquire data and therefore, acquisition time can be shorten to half. Embodiments of the quality check method and device may examine more characteristics of the PET systems.

The medical imaging device and method discussed above allows for determining the quality of sinograms produced with a medical imaging device. The invention, therefore, is well adapted to carry out the objects and attain the ends and advantages mentioned, as well as others inherent therein. While the invention has been described and is defined by reference to particular preferred embodiments of the invention, such references do not imply a limitation on the invention, and no such limitation is to be inferred. The invention is capable of considerable modification, alteration, and equivalents in form and function, as will occur to those ordinarily skilled in the pertinent arts. The described preferred embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A method for determining quality of sinograms produced by a medical imaging device, comprising the steps of:
    placing a uniform phantom object in the field of view of the medical imaging device;
    acquiring one or more phantom sinograms of the uniform phantom object;
    establishing a set of parameters for the acquired one or more phantom sinograms; and
    determining, based on pre-set ranges of the parameters, the quality of sinograms produced by the medical imaging device; wherein the parameters comprises one or more parameters of a group of parameters consisting of block uniformity, block efficiency, randoms rate, scanner efficiency, and scatter ratio.

2. The method according to claim 1, wherein establishing the block uniformity further comprising the steps of:
    obtaining mean crystal efficiency averaged over all blocks in the medical imaging device; and
    calculating for each of the blocks the root mean square error (RMSE) based on the mean crystal efficiency,
    wherein determining the quality of sinograms produced by the medical imaging device is made in relation to the RMSE of each block being inside or outside a pre-set range.

3. The method according to claim 2, wherein the pre-set range is set to 10.

4. The method according to claim 1, wherein establishing the block efficiency further comprising the step of:
    calculating the block efficiency for each block based on the mean crystal efficiency averaged over all blocks,
    wherein determining the quality of sinograms produced by the medical imaging device is made in relation to the block efficiency of each block being inside or outside a pre-set range.

5. The method according to claim 4, wherein the pre-set range is set to 20 percent.

6. The method according to claim 1, wherein establishing the randoms rate efficiency further comprising the step of:
    calculating total numbers of line of responses (LORs) during a coincidence window and multiply the total numbers of LORs with the square of the singles rate per crystal,
    wherein determining the quality of sinograms produced by the medical imaging device is made in relation to the randoms rate being inside or outside a pre-set range.

7. The method according to claim 6, wherein the pre-set range is set to plus/minus 15 percent.

8. The method according to claim 1, wherein establishing the scanner efficiency further comprising the step of:
    calculating the total number of true events over a specific scan time divided by an amount of activity in the field of view,
    wherein determining the quality of sinograms produced by the medical imaging device is made in relation to the scanner efficiency being inside or outside a pre-set range.

9. The method according to claim 8, wherein the pre-set range is set to plus/minus 30 percent.

10. The method according to claim 1, wherein establishing the scatter ratio further comprising the step of:
    calculating the scatter ratio as scatter events compared to total events,
    wherein determining the quality of sinograms produced by the medical imaging device is made in relation to the scatter ratio being inside or outside a pre-set range.

11. The method according to claim 10, wherein the pre-set range is set to plus/minus 30 percent.

12. The method according to claim 1, wherein the medical imaging device is a positron emission tomograph (PET), or positron emission tomograph combined with computed tomograph for X-ray (PET/CT).

13. A medical imaging device for checking quality of sinograms produced by the medical imaging device, comprising:
    detectors for scanning a uniform phantom object in the field of view of the detectors;
    at least one processor configured to acquire one or more phantom sinograms of the uniform phantom object;
    the at least one processor being further configured to establish a set of parameters for the acquired one or more phantom sinograms; and
    the at least one processor being further configured to determine, based on pre-set ranges of the parameters, the quality of sinograms produced by the medical imaging device, wherein the parameters comprises one or more of a group of parameters consisting of block uniformity, block efficiency, randoms rate, scanner efficiency, and scatter ratio.

14. The medical imaging device according to claim 13, wherein the at least one processor is further configured to establishing the block uniformity by:
    obtaining mean crystal efficiency averaged over all blocks in the medical imaging device; and calculating for each of the blocks the root mean square error (RMSE) based on the mean crystal efficiency, wherein the at least one processor is further configured to determine the quality of sinograms produced by the medical imaging device in relation to the RMSE of each block being inside or outside a pre-set range.

15. The medical imaging device according to claim 14, wherein the pre-set range is set to 10.

16. The medical imaging device according to claim 13, wherein the at least one processor is further configured to establishing the block efficiency by:

calculating the block efficiency for each block based on the mean crystal efficiency averaged over all blocks, wherein the at least one processor is further configured to determine the quality of sinograms produced by the medical imaging device in relation to the block efficiency of each block being inside or outside a pre-set range.

17. The medical imaging device according to claim 16, wherein the pre-set range is set to 20 percent.

18. The medical imaging device according to claim 13, wherein the at least one processor is further configured to establishing the randoms rate efficiency by:

calculating total numbers of line of responses (LORs) during a coincidence window and multiply the total numbers of LORs with the square of the singles rate per crystal, wherein the at least one processor is further configured to determine the quality of sinograms produced by the medical imaging device in relation to the randoms rate being inside or outside a pre-set range.

19. The medical imaging device according to claim 18, wherein the pre-set range is set to plus/minus 15 percent.

20. The medical imaging device according to claim 13, wherein the at least one processor is further configured to establishing the scanner efficiency by:

calculating the total number of true events over a specific scan time divided by an amount of activity in the field of view, wherein the at least one processor is further configured to determine the quality of sinograms produced by the medical imaging device in relation to the scanner efficiency being inside or outside a pre-set range.

21. The medical imaging device according to claim 20, wherein the pre-set range is set to plus/minus 30 percent.

22. The medical imaging device according to claim 13, wherein the at least one processor is further configured to establishing the scatter ratio by:

calculating the scatter ratio as scatter events compared to total events, wherein the at least one processor is further configured to determine the quality of sinograms produced by the medical imaging device in relation to the scatter ratio being inside or outside a pre-set range.

23. The medical imaging device according to claim 22, wherein the pre-set range is set to plus/minus 30 percent.

24. The medical imaging device according to claim 13, wherein the medical imaging device is a positron emission tomograph (PET), or positron emission tomograph combined with computed tomograph for X-ray (PET/CT).

* * * * *